Dec. 24, 1968   J. W. ROY   3,418,442
METHOD FOR MAKING HERMETIC SEALS
Filed Nov. 16, 1964   2 Sheets-Sheet 1
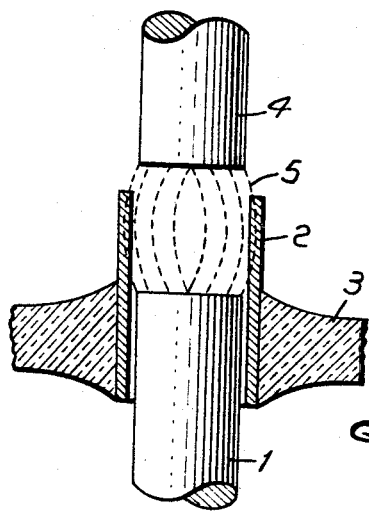
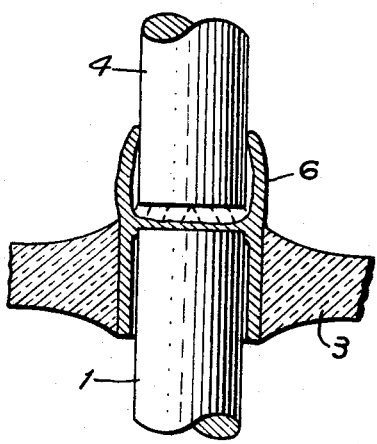
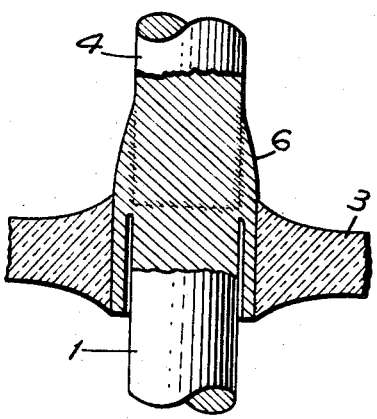
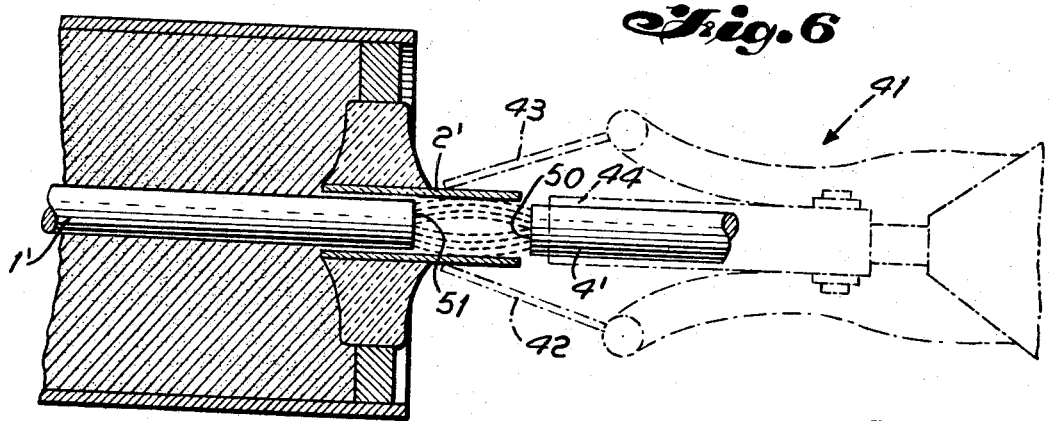
INVENTOR.
JAMES W. ROY
BY
*Judson Jaget*
ATTORNEY Dec. 24, 1968         J. W. ROY              3,418,442
            METHOD FOR MAKING HERMETIC SEALS
Filed Nov. 16, 1964                    2 Sheets-Sheet 2
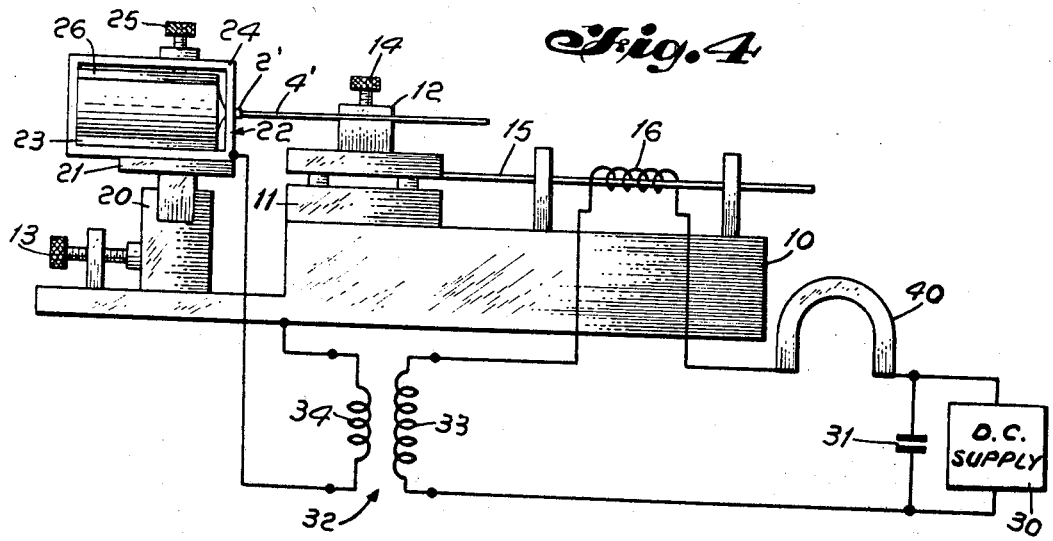
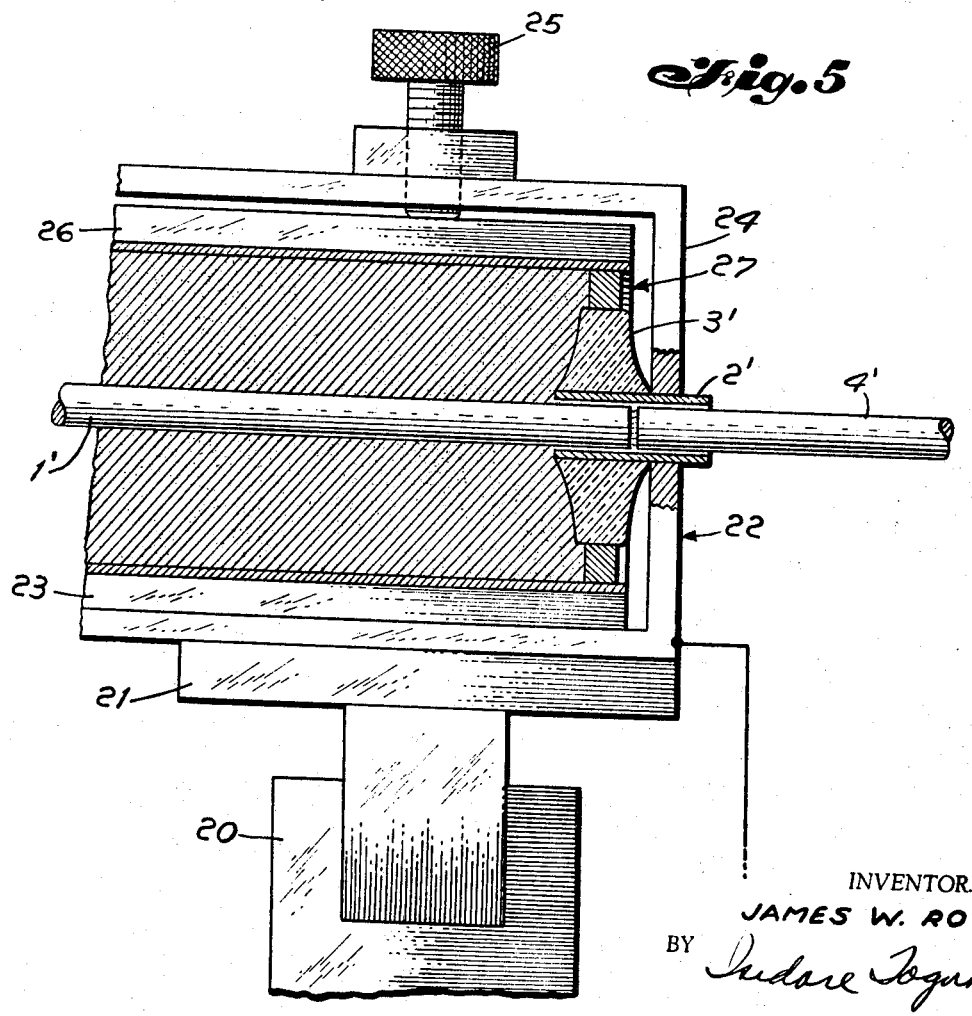
INVENTOR.
JAMES W. ROY
BY
Isidore Togut
ATTORNEY

United States Patent Office 3,418,442
Patented Dec. 24, 1968

3,418,442
METHOD FOR MAKING HERMETIC SEALS
James W. Roy, Morristown, N.J., assignor to International Telephone and Telegraph Corporation, Nutley, N.J., a corporation of Maryland
Filed Nov. 16, 1964, Ser. No. 411,343
7 Claims. (Cl. 219—100)

ABSTRACT OF THE DISCLOSURE

This is a method of obtaining an improved hermetic seal for a tantalum electrolytic capacitor by fusing together the internal wire of the device, an external terminal wire and a metallic envelope which surrounds these wires. This is accomplished by applying a high frequency electric field between the external and internal wires and the envelope while moving the external wire towards the internal wire causing the internal wire and envelope to start to melt. The advancing external wire is then butted to the internal wire and a high energy pulse is simultaneously discharged welding the internal and external wires together, thereby causing a ring of metal to be extruded from the butt area which alloys with the envelope, thus providing for a good hermetic seal.

---

This invention refers to a method for making hermetic seals and more particularly to a method for making hermetic seals for an electrolytic capacitor.

In the prior art, the final seal-off for solid electrolyte tantalum capacitors is normally accomplished by filling the annulus space between the metal ferrule which is an integral part of a glass metal seal assembly and the terminal wire extending through it with solder. This solder closure is subject to remelting during subsequent soldering operations required in assembling the component into a circuit. Failure of the solder closure to resolidify as a hermetic seal and the flow of solder into the unit to short circuit the devices are two failure modes for normal solder seal. The inadequate seal is of greater concern since the component will be most likely to fail sometime after the circuit has been tested and placed in service.

The immediate object of this invention is to provide a reliable hermetic seal for tantalum electrolytic capacitors but would be applicable to any component presently sealed by solder.

The improved seal is obtained by the simultaneous fusing of a tantalum internal wire (within the body of the tantalum electrolytic capacitor), the metal ferrule of the glass (or ceramic) to metal insulating assembly, and the external terminal wire. The resulting weld is thus attained at a much higher temperature than the temperature of molten solder used in connecting electrical components.

A feature of this invention is a method for making hermetic seals at the junction of an internal wire and an external wire comprising surrounding the ends of the wires to be joined with a metallic envelope extending over a portion of said internal wire and said external wire, moving said external wire towards said internal wire, applying a high frequency electric field between said external wire and said internal wire and said envelope, forcing the ends of said wire together and simultaneously discharging a high energy electric pulse to weld together said external and internal wires and said envelope.

Another feature of this invention is a method for making hermetic seals which involves surrounding the ends of an internal wire and an external wire which are to be joied with a metallic envelope extending over a portion of said internal and external wires, moving said external wire to abut said internal wire, applying an electric current to said internal and external wires and said envelope and moving away said external wire from said internal wire to create an electric arc between said internal and external wires and said metallic envelope to fuse together said wires and said envelope.

The above-mentioned and other features and objects of this invention will become more apparent by reference to the following description taken in conjunction with the accompanying drawings, in which:

FIGURE 1 shows the end portion of an electrolytic capacitor with internal wire and external wire to be joined thereto and to the metal ferrule and the application of an electric field between the wires and the ferrule;

FIGURE 2 shows the melting of the ferrule in the electric field as the external wire is moved closer to the internal wire;

FIGURE 3 shows the fusing of the ferrule to the external wire and the internal wire which are now welded together;

FIGURE 4 shows one embodiment of an apparatus suitable for producing the hermetic seal of this invention;

FIGURE 5 shows an enlarged portion of the embodiment of FIGURE 4; and

FIGURE 6 shows another embodiment of a device suitable for producing the hermetic seal of this invention.

The preferred method of this invention involves assembling the capacitor to the point where the internal tantalum wire extends into the insulated ferrule which is located in final sealing position in the capacitor case. The improved seal of this invention is obtained by the simultaneous fusing of a tantalum internal wire 1, a ferrule metal 2 of the glass of ceramic-to-metal insulating assembly 3 as the case may be, and the external terminal wire 4, as shown in FIGURE 1. There is also shown the representation of the electric field 5 as represented by the curved broken lines extending between the internal and external wires 1 and 4 and the metal ferrule 2. Although the drawing shows a gap existing between the internal wire 1 and the metal ferrule 2, this is for purposes of clarity and it should be understood that what is shown here is a sliding fit so that there does exist a physical contact between the internal wire 1 and the metal ferrule 2. The ferrule 2 and the glass or ceramic 3 constitute a prearranged metal-to-glass seal. The metal ferrule 2 may be made of a metal called Kovar, which is used to a great extent in glass-to-metal seals since the co-efficient of expansion of Kovar and glass are almost similar. The external wire 4 is spaced apart as shown in FIGURE 1 from the internal wire 1 and the metal ferrule 2 and a high frequency field is applied between the external wire and the internal wire and the ferrule. At the same time, the external wire is advanced towards the internal wire. With the external wire acting as a cathode, the ferrule and internal wire are bombarded with electrons and begin to melt as is shown in FIGURE 2. The advancing external wire is then butted to the internal wire, the high frequency field is terminated and a high energy pulse is simultaneously discharged to weld the external and internal wires together and at the same time extrude an annular ring 6 of metal from the butt area to alloy with the ferrule and accomplish a true hermetic seal. The completed fused hermetic seal is shown in FIGURE 3.

Referring now to FIGURES 4 and 5, there is shown a suggested apparatus which can be used to effectuate the fusion weld of this invention. There is provided a long bed plate 10 which may have an open groove in which can be placed a base 11 which is movable in the groove (not shown) in a lengthwise direction. Attached to the base 11 is a mounting 12 through which can be inserted an external wire 4'. This wire 4' is held in place by means of a clamping screw 14. Attached to the base 11 is a rod 15 which as shown in a simple way, constitutes the core of a solenoid, the coil of which is shown by the coil 16. Also attached to the bed plate 10 and disposed opposite to the base 11 is a support 20 which is also adjustable in a lengthwise direction by means of the screw device 13. On the base 20 is disposed a dielectric plate 21 and connected firmly to the dielectric plate 21 is a metal clamp 22 which is used to clamp the ferrule 2' of an electrolytic capacitor. Placed above the lower arm of clamp 22 is another dielectric plate 23. The upper portion 24 of the clamp 22 has on the top thereof an adjusting screw 25 that is set into a tapped hole (not shown) therein and presses down on a dielectric member 26 to hold down the electrolytic capacitor 27. The spacing between the dielectric members 23 and 26 is sufficient to accommodate the outside case of the electrolytic capacitor which is to have performed thereon the hermetic sealing described above. The metal clamp 22 effectively grips the ferrule 2'. The circuitry utilized in this apparatus includes a direct current supply 30, and a capacitor 31 which is connected across the leads of the direct current supply. The primary 33 of transformer 32 is connected at one end to the DC supply source 30 and the other end to the solenoid coil 16. The secondary 34 of the transformer 32 is connected, one end to the clamping member 22 and the other end to the bed plate 10 and by virtue of the metal-to-metal connection, the connection effectively is made to the member 12 mounted on the support 11 so that the circuit would include the connection to the external wire 4' and the internal wire 1' of the electrolytic capacitor. A switching means 40 is connected between the DC supply and the other end of the solenoid coil 16 through which is discharged the electric charge on condenser 31 through the primary coil 33 of the transformer 32. This switch 40 may be a mercury arc tube switch is well known to the prior art. In the operation of this apparatus, the condenser 31 is charged by the direct current source, the internal and external wires are aligned and adjusted to bring them in line with each other and in slight contact and then the tube switch is ionized to render the tube conductive. The discharge current from the condenser 31 flowing through the primary coil 33 induces a high frequency welding current to flow through the secondary 34 and the lightly contacted ends of the wires 1' and 4'. The high frequency nature of the current produces dielectric heating of any oxide film on the wire ends at the points of contact. This produces a melting of the wire ends and the ferrule 2. Almost simultaneously with the conduction of the welding current into the secondary 34, the flux produced in the transformer 32 propels the rod 15 and the member 11 toward the tail piece 20 so that the two wires are brought together in abutment and magnetic forging pressure is created on the ends of the wire. The two wires are thus welded together and the metal ferrule tube melts to form the annular ring 6.

FIGURE 6 shows another device which can be used to effectuate the fusion weld for the electrolytic capacitor. In this case there is shown a welding accessory or device which is the subject of a patent application in the name of Thomas W. Conrad filed Apr. 13, 1964, Ser. No. 359,025. As shown in FIGURE 6, the welding accessory 41 comprises two electrodes 42 and 43. All parts of the welding accessory are shown in broken lines, and the full device is not shown except for the electrode portion. The electrodes 42 and 43 grip the ferrule 2' as shown. The external wire 4' is held within a pivoted jaw 44. This device which is more fully explained in the patent application, is operated by a microswitch in the handle of the device (not shown) which instantaneously applies an RF initiating potential and a welding current from a power supply (also not shown) across the electrode gap. The wire 4' is set in the jaw of the welding device 41 so that it is spaced apart an appropriate distance from the end of wire 1' and the ferrule 2'. The welding current released by the RF initiating potential establishes an arc between the ends of wires 4' and 1' and the ferrule 2' and at the instant that the arc is fired, a bobbin (not shown) in the welding accessory 41 drives the flat end 50 of the wire 4 against the flat end 51 of the inner wire 1' in a percussive forcing blow and at the same time, the welding current discharge quickly reaches a high average peak when it is applied and this with the percussive movement occurring very rapidly the molten surfaces are driven together and thus the internal and external wires and the ferrule are fused together. After the electrodes have come into percussive engagement slippage of the wire in the jaw occurs, the microswitch contacts open and the device is returned to the initial position.

While I have described above the principles of my invention in connection with specific apparatus, it is to be clearly understood that this description is made only by way of example and not as a limitation to the scope of my invention as set forth in the objects thereof and in the accompanying claims.

I claim:

1. A method for making hermetic seals at the junction of an internal wire and an external wire comprising surrounding the ends of the wires to be joined with a metallic envelope extending over a portion of said internal wire and said external wire, moving said external wire towards said internal wire, applying a high frequency electric field between said external wire and said internal wire and said envelope, forcing the ends of said wires together and simultaneously discharging a high energy electric pulse to weld together said external and internal wires and said envelope.

2. A method for making hemetic seals at the junction of an internal wire and an external wire comprising surrounding the ends of said wires to be joined with a metallic envelope extending over a portion of said internal and external wires, moving said external wire to abut said internal wire, applying an electric current to said internal and external wires and said envelope, and to create an electric field between said internal and external wires and said metallic envelope to fuse together said wires and said envelope, forcing said external wire towards said internal wire and simultaneously discharging a high energy electric pulse to weld together said external and internal wires and said envelope.

3. A method for making hermetic seals according to claim 1 where said metallic envelope comprises a metal ferrule and said inner wire is disposed partially within said ferrule.

4. A method for making hermetic seals according to claim 1 wherein said envelope is melted to form an annular bead about the junction of said inner and outer wires.

5. A method for making hermetic seals for a capacitor comprising, joining a metal ferrule to an annular glass member, sealing said glass member to a metal capacitor case, inserting an inner wire into said metal capacitor case with a portion of one end of said wide protruding into said ferrule, placing an external wire opposite the end of said internal wire and axial therewith, moving said external wire towards said internal wire, applying an electric field between said external wire and internal wire and ferrule, forcing the ends of said external and internal wires together and simultaneously discharging a high energy pulse to weld together said external and internal wires and said ferrule.

6. A method according to claim 5 wherein said internal wire is tantalum.

7. A method for making hermetic seals for a capacitor comprising, joining a metal ferrule to an annular ceramic member, sealing said ceramic member to a metal capacitor case, inserting an inner wire into said metal capacitor case with a portion of one end of said wire protruding into said ferrule, placing an external wire opposite the end of said internal wire and axial therewith, moving said external wire towards said internal wire, applying an electric field between said external wire and internal wire and ferrule, forcing the ends of said external and internal wires together and simultaneously discharging a high energy pulse to weld together said external and internal wires and said ferrule.

References Cited
UNITED STATES PATENTS

| | | | |
|---|---|---|---|
| 1,575,994 | 3/1926 | Laise | 219—117 X |
| 2,301,899 | 11/1942 | McBain | 219—106 X |
| 2,352,754 | 7/1944 | Anderson et al. | 219—105 |
| 2,922,542 | 1/1960 | Barr | 219—99 X |

RICHARD M. WOOD, *Primary Examiner.*

J. G. SMITH, *Assistant Examiner.*

U.S. Cl. X.R.

219—106; 29—628